United States Patent [19]
Thise et al.

[11] Patent Number: 4,877,073
[45] Date of Patent: Oct. 31, 1989

[54] CABLES AND TIRES REINFORCED BY SAID CABLES

[75] Inventors: Marie R. Thise, Bras, Belgium; Rene F. Reuter, Burden, Luxembourg

[73] Assignee: The Goodyear Tire & Rubber Company, Akron, Ohio

[21] Appl. No.: 156,677

[22] Filed: Feb. 17, 1988

[51] Int. Cl.[4] .......................... D02G 3/48; B60C 9/20
[52] U.S. Cl. .................................. 152/451; 57/237; 57/902; 152/527; 152/531
[58] Field of Search ................ 57/902, 210, 211, 212, 57/237, 242; 152/451, 526, 527, 531, 548, 556

[56] References Cited

U.S. PATENT DOCUMENTS

| | | | |
|---|---|---|---|
| 1,825,071 | 9/1931 | Kayser | 57/237 |
| 2,138,950 | 12/1938 | Whitehead | 57/237 X |
| 2,656,585 | 10/1953 | Jackson | 57/210 X |
| 3,092,955 | 6/1963 | Smit | 57/237 |
| 3,393,252 | 7/1968 | Zimmerman | 152/451 X |
| 3,419,059 | 12/1968 | Bridge, Jr. | 57/902 X |
| 3,420,049 | 1/1969 | Heberlein | 57/211 |
| 3,422,873 | 1/1969 | Liska | 57/902 X |
| 3,667,529 | 6/1972 | Mirtain | 152/527 |
| 3,850,219 | 11/1974 | Snyder | 152/531 |
| 3,900,062 | 8/1975 | Neville et al. | 152/527 |
| 3,977,172 | 8/1976 | Kerawalla | 57/237 |
| 3,979,536 | 9/1976 | Neville et al. | 428/43 |
| 3,990,493 | 11/1976 | Caretta | 152/526 |
| 4,094,354 | 6/1978 | Ferrell et al. | 152/531 |
| 4,098,315 | 7/1978 | Ferrell et al. | 152/531 |
| 4,155,394 | 5/1979 | Shepherd et al. | 152/527 |
| 4,240,486 | 12/1980 | Schmit et al. | 152/451 X |
| 4,343,343 | 8/1982 | Reuter | 57/210 X |
| 4,623,011 | 11/1986 | Kanuma | 152/451 |
| 4,720,943 | 1/1988 | Arrant | 57/210 |

FOREIGN PATENT DOCUMENTS

| | | |
|---|---|---|
| 889667 | of 1972 | Canada . |
| 2006982 | 8/1971 | Fed. Rep. of Germany . |
| 2623270 | 12/1977 | Fed. Rep. of Germany . |
| 2824357 | of 1979 | Fed. Rep. of Germany . |
| 538767 | 6/1922 | France . |
| 764796 | 5/1934 | France . |

Primary Examiner—Raymond Hoch
Attorney, Agent, or Firm—L. R. Drayer

[57] ABSTRACT

A nonmetallic cable (20) having utility in an overlay ply (39) of a tire (10) comprises two yarns (21,22). One of the yarns (21,22) has a yarn twist of either zero or is twisted in a first direction. The other yarn (21,22) has a yarn twist that is not zero, but is twisted in a direction opposite to the direction of yarn twist in the first yarn (21,22). The cable (20) has a cable twist that is opposite in direction to the twist of the yarn (21,22) having the larger of the two yarn twists. The cable has an elongation of 4% when it is subjected to a force of not greater than 12 Newtons. A tire (10) having a belt structure (30) has an overlay (39) comprising said cables disposed radially outwardly of at least one of the belt plies (31-35).

17 Claims, 3 Drawing Sheets

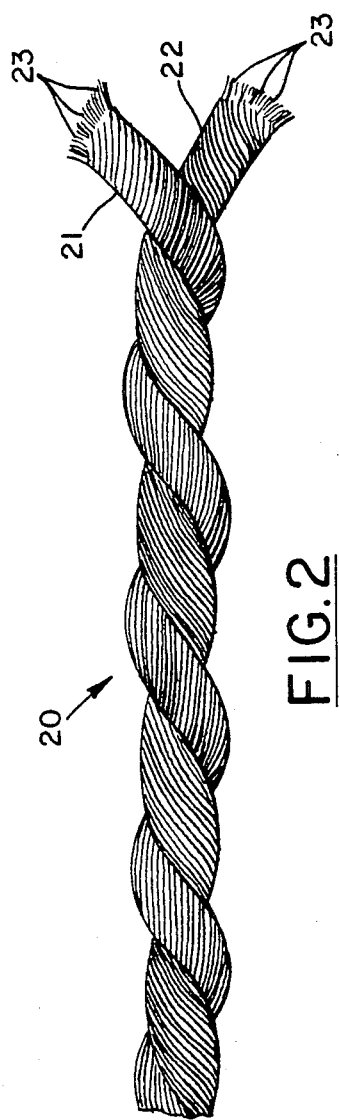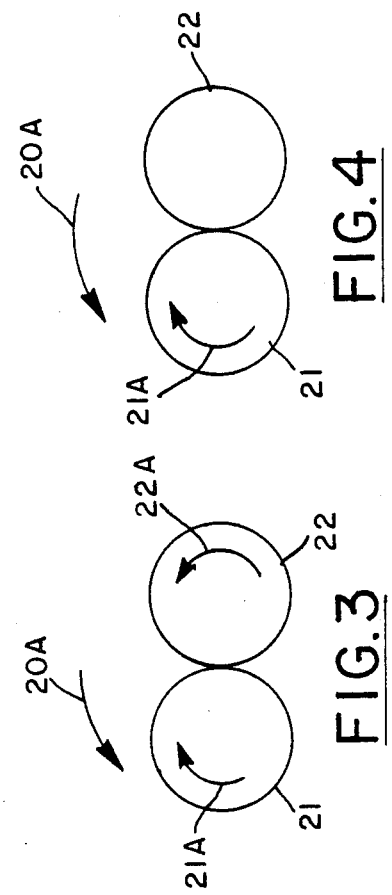

CABLES AND TIRES REINFORCED BY SAID CABLES

The present invention relates to nonmetallic cables having utility for reinforcing tires, and to tires that are reinforced by said cables.

Tires having a reinforcing member disposed radially outwardly of the belt plies comprising cables oriented at small angles with respect to the mid-circumferential plane of the tire have been found to be particularly durable when subjected to high revolution speeds. Such a reinforcing member is often referred to as an overlay ply. An overlay ply can, for example, be interposed between the radially outermost belt ply and the tread and comprise one or more wraps having a width which is about equal to that of the widest of the belt plies. Alternatively, the overlay ply can consist of two separate axially spaced apart ply portions either disposed radially outwardly of the belt such as to cover the edges of the radially outermost belt ply or interposed between the belt plies such as to extend between the edges thereof.

In the following description, the overlay ply will be described in terms of at least one wrap disposed between the belt and the tread, but it will become apparent to a person skilled in the art that problems encountered in the prior art with single overlay plies and the solutions that the present invention presents thereto apply equally to overlay plies comprising two or more wraps or two or more portions as described above.

The overlay ply is usually applied onto the unvulcanized tire as a single annular layer disposed radially outwardly of the belts with the two end portions of the ply slightly overlapping to form a splice. However, as a result of the expansion of the tire in the curing mold and as a result of the thermal contraction of the textile filaments, the stresses in the cords of the ply are nonuniformly distributed around the circumference of the tire and slippage between the overlay ply end portions tends to occur at their overlap region. This slippage at the overlap region of the overlay ply generally produces an undesired distortion on the underlying belts. This, in turn, can result in an unbalanced portion in the tire and a reduction in tire uniformity. These undesirable conditions are aggravated by the vulcanizing of a tire in a two piece mold rather than a segmented mold.

The degree of nonuniformity displayed by tires having overlay plies comprising known cables has been significantly reduced in tires having overlay plies employing the new cables disclosed herein.

There is provided in accordance with one aspect of the invention a nonmetallic cable comprising two yarns, one of said yarns having a yarn twist that is at least twice as large as the yarn twist of the other yarn, said yarn twists being in opposite directions from one another, said cable having a cable twist that is opposite in direction to the twist of the yarn having the larger of the two yarn twists, and said cable having an elongation of 4% when subjected to a force of not greater than 12 Newtons.

There is provided in accordance with another aspect of the invention a nonmetallic cable comprising two yarns, one of said yarns having a yarn twist of zero and the second yarn having a yarn twist in a first direction, said cable having a cable twist in a second direction that is opposite to said first direction, and said cable having an elongation of 4% when subjected to a force of not greater than 12 Newtons.

There is provided in accordance with another aspect of the invention a cable comprising two yarns of nylon 6 or nylon, 6,6, one of said yarns having a yarn twist of greater than zero but not more than 5 turns per inch in a first direction and said second yarn having a yarn twist that is at least three times the yarn twist of the first yarn in a second direction, said cable having a cable twist in said first direction, and said cable having an elongation of 4% when subjected to a force of not greater than 12 Newtons.

There is provided in accordance with another aspect of the invention a cable comprising two yarns of nylon 6 or 6,6, one of said yarns having a yarn twist of zero and the other yarn having a yarn twist in the range of 10 turns per inch to 16 turns per inch in a first direction, said cable having a cable twist in a second direction that is opposite to said first direction, and said cable having an elongation of 4% when subjected to a force of not greater than 12 Newtons.

There is provided in accordance with another aspect of the invention a tire comprising: at least one carcass ply; at least one belt ply disposed radially outwardly of said carcass ply in a crown portion of the tire; and a reinforcing member disposed radially outwardly of said belt ply and comprising at least one nonmetallic cable disposed at 0° to 20° with respect to a mid-circumferential plane of the tire, said cable comprising two yarns, one of said yarns having a yarn twist that is at least twice as large as the yarn twist of the other yarn, said yarn twists being in opposite directions from one another, said cable having a cable twist that is opposite in direction to the twist of the yarn having the larger of the two yarn twists, and said cable having an elongation of 4% when subjected to a force of not greater than 12 Newtons.

There is provided in accordance with another aspect of the invention a tire comprising: at least one carcass ply; at least one belt ply disposed radially outwardly of said carcass ply in a crown portion of the tire; and a reinforcing member disposed radially outwardly of said belt ply and comprising at least one nonmetallic cable disposed at 0° to 20° with respect to a mid-circumferential plane of the tire, said cable comprising two yarns, one of said yarns having a yarn twist of zero and the second yarn having a yarn twist in a first direction, said cable having a cable twist in a second direction that is opposite to said first direction, and said cable having an elongation of 4% when subjected to a force of not greater than 12 Newtons.

There is provided in accordance with another aspect of the invention a tire comprising: at least one carcass ply; at least one belt ply disposed radially outwardly of said carcass ply in a crown portion of the tire; and a reinforcing member disposed radially outwardly of said belt ply and comprising at least one nonmetallic cable disposed at 0° to 20° with respect to a mid-circumferential plane of the tire, said cable comprising two yarns of nylon 6 or nylon 6,6, one of said yarns having a yarn twist of greater than zero but not more than 5 turns per inch in a first direction and said second yarn having a yarn twist that is at least three times the yarn twist of the first yarn, in a second direction, said cable having a cable twist in said first direction, and said cable having an elongation of 4% when subjected to a force of not greater than 12 Newtons.

There is provided in accordance with another aspect of the invention a tire comprising: at least one carcass ply; at least one belt ply disposed radially outwardly of said carcass ply in a crown portion of the tire; and a reinforcing member disposed radially outwardly of said belt ply and comprising at least one nonmetallic cable disposed at 0° to 20° with respect to a mid-circumferential plane of the tire, said cable comprising two yarns of nylon 6 or nylon 6,6, one of said yarns having a yarn twist of zero and said second yarn having a yarn twist that is at least 10 turns per inch in a first direction, said cable having a cable twist in a direction that is opposite to said first direction, and said cable having an elongation of 4% when subjected to a force of not greater than 12 Newtons.

The present invention may best be understood by referring to the following detailed description, in conjunction with the accompanying drawings in which:

FIG. 2 is an enlarge view of a cable according to the present invention;

FIGS. 3 and 4 are schematic representations of cross-sections of cables according to the invention.

Figure 1:
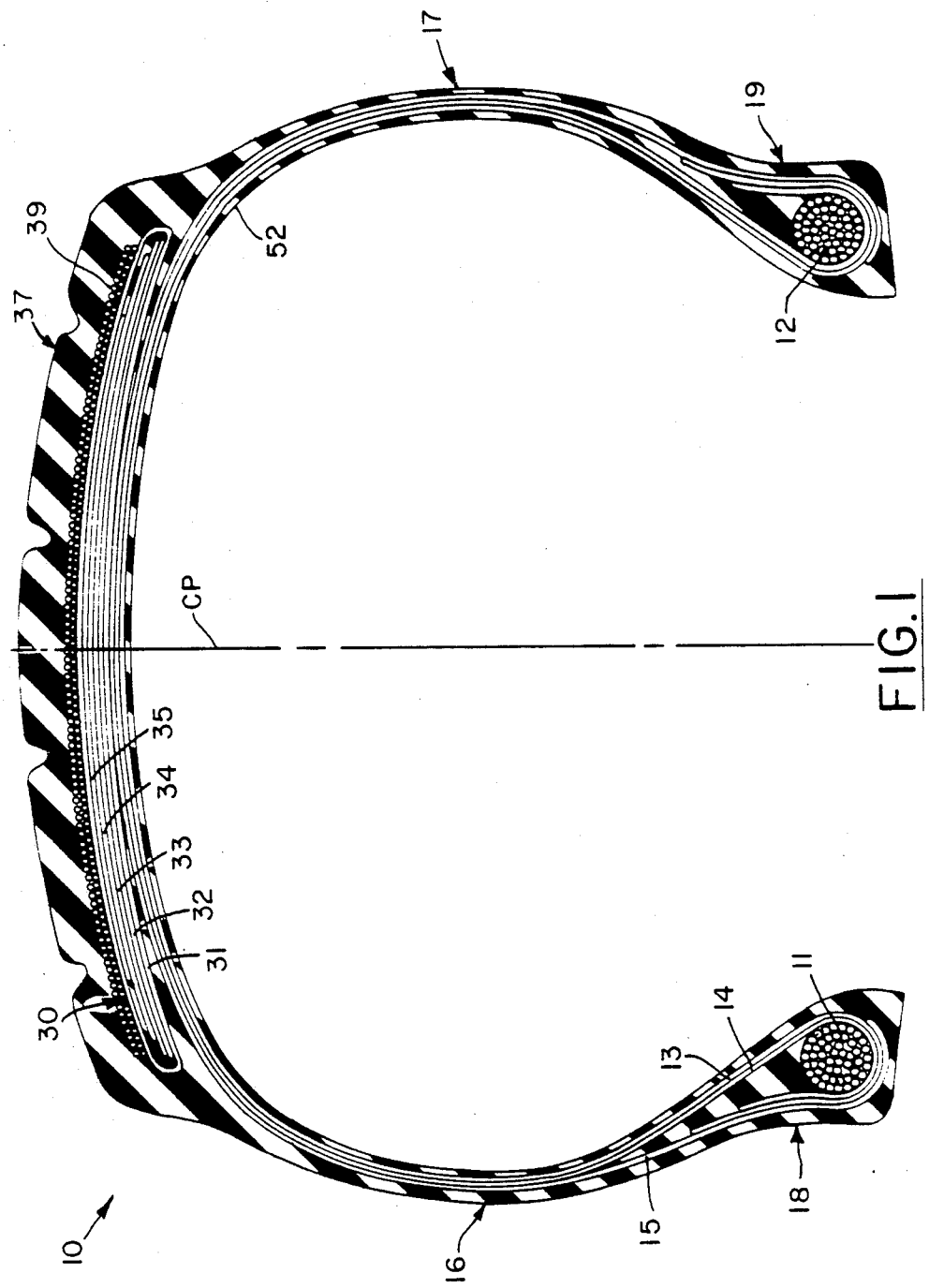
FIG. 1 is a cross-sectional view of a tire taken in a plane that contains the tire's axis of rotation.

With reference to FIG. 1, there is shown an example of a tire 10 according to the invention which has a pair of substantially inextensible annular bead cores 11,12 which are axially spaced apart with one or more carcass plies 13,14,15 extending between the bead cores.

As used herein and in the claims, the terms "axial" and "axially" refer to directions which are parallel to the axis of rotation of a tire, and the terms "radial" and "radially" refer to directions that are perpendicular to the axis of rotation of the tire. Each of the carcass plies 13,14,15 comprises a plurality of cables oriented at 60° to 90°, preferably 75° to 90°, with respect to a mid-circumferential plane CP of the tire. Put another way, a tire in accordance with the present invention is commonly referred to as a radial ply tire. As used herein and in the claims the "mid-circumferential plane" of a tire is a plane that is perpendicular to the axis of rotation of the tire and is located midway between the sidewalls of a tire when the tire is not subjected to any load. A turn-up carcass ply 13,14 is a ply which is folded axially and radially outwardly about each of the bead cores 11,12 and a turn-down carcass ply 15 is a ply which is folded radially and axially inwardly about each of the bead cores 11,12. It is understood that the present invention applies to tires having any number of turn-down, or turn-up, or both turn-down and turn-up carcass plies of any suitable material.

If a tire is of the tubeless variety, a substantially air impervious layer 52 is disposed inwardly of all of the carcass plies 13,14,15. If desired, a barrier ply of a suitable material (not shown) is disposed between the air impervious layer 52 and the innermost carcass ply 13. The barrier ply functions to separate the air impervious layer from the elastomeric material in which the cables of the carcass ply 3 are embedded.

A belt structure 30 comprising two or more belt plies 31–35 is disposed radially outwardly of all of the carcass plies 13,14,15 in a crown region of the tire. A ground engaging tread portion 37 is disposed radially outwardly of the belt structure 30, and a sidewall portion 16,17 extends radially inwardly from each axial edge of the tread portion to a respective bead portion 18,19. In the example illustrated in FIG. 1, one of the belt plies 31 is folded and the remainder of the belt plies 32–35 are unfolded. It is understood that the particular belt structure illustrated in FIG. 1 and described herein is merely an example of a tire according to the invention and that a tire designer may employ any arrangement of folded or unfolded belt plies in accordance with the performance requirements of a particular tire while still practicing the present invention.

A reinforcing member 39 is disposed radially outwardly of a belt ply, and preferably radially outwardly of the entire belt structure 30, in a crown portion of the tire. The reinforcing member comprises at least one nonmetallic cable disposed at 0° to 20° with respect to the mid-circumferential plane CP of the tire. As used herein, a "nonmetallic" cable is understood not to contain any metallic filaments.

With reference to FIG. 2, a cable 20 according to the invention comprises two yarns 21,22, each of which comprises a plurality of filaments 23. In accordance with one embodiment of the invention, one of the yarns 21,22 has a yarn twist that is at least twice as large as the yarn twist of the other yarn 21,22, and the cable 20 has a cable twist that is opposite in direction to the twist of the yarn 21,22 having the larger of the two yarn twists. In accordance with another embodiment of the invention, one of the yarns 21,22 has a yarn twist of zero and the second yarn 21,22 has a yarn twist in a first direction, and the cable 20 has a cable twist in a second direction that is opposite to said first direction.

The concept of twist can be explained by referring to FIGS. 3 and 4. In a cable 20 used in practicing the present invention, each of the yarns 21,22 has its component filaments 23 twisted together a given number of turns per unit of length of the yarn (typically, the unit of length is 1 inch or 1 meter) and the yarns are twisted together a given number of turns per unit of length of the cable. Twist dimensions used herein are in inches. As used herein, the direction of twist refers to the direction of slope of the spirals of a yarn or cable when it is held vertically. If the slope of the spirals conforms in direction to the slope of the letter "S", then the twist is called "S" or "left hand". If the slope of the spirals conforms to the slope of the letter "Z", then the slope is called "Z" or "right hand". As used herein an "S" or "left hand" twist direction is understood to be an opposite direction from a "Z" or "right hand twist". "Yarn twist" is understood to mean the twist imparted to a yarn before the yarn is incorporated into a cable, and "cable twist" is understood to mean the twist imparted to two or more yarns when they are twisted together with one another to form a cable.

It is important to note that as used herein all references to denier, of both yarns and cables, relate to the denier of a yarn, or yarns, before any twist is imparted to the yarn(s). Of course, when a twist is imparted to a yarn or cable, the actual weight per unit of length increases. "Denier" is understood to mean the weight in grams of 9,000 meters of a yarn before the yarn has any twist imparted thereto. For example, a 1500/3 cable comprises three yarns each of which has a denier of 1500 before any twist at all is imparted thereto, such that the cable denier is 4500.

If, for example only, with references to FIG. 3 the filaments of one of the yarns 22 are twisted together in the direction indicated by arrow 22A at 4 turns per inch (157 turns per meter) and the filaments of the other yarn 21 are twisted together in the direction indicated by arrow 21A at 9 turns per inch (354 turns per meter), the two yarns 21,22 will have yarn twists of unequal values and in opposite directions. The yarns 21, 22 are then twisted together in the direction indicated by arrow 20A at 12 turns per inch (472 turns per meter) so that the cable has a cable twist 20A that is opposite in direction to the twist 21A of the yarn 21 having the larger of the two yarn twists. During the cable twisting operation, the twist in the yarns will be altered, but the resultant twist in the yarns will not be equal to one another. As used herein "resultant yarn twist" is understood to mean the twist a yarn has after it has been incorporated into a cable.

If for example only, with reference to FIG. 4, the filaments of one of the yarns 22 have no twist imparted thereto before the cable twisting operation the yarn 22 will have a yarn twist of zero. If the other yarn 21 has a yarn twist of 14 turns per inch (551 turns per meter) in a direction indicated by arrow 21A, and then the yarns 21,22 are twisted together in the direction indicated by arrow 20A, which is opposite to direction 21A, at 13 turns per inch (512 turns per meter) the resultant twists in the yarn will be opposite directions and will have different values.

When a tire is vulcanized in a two piece mold, the circumference of the tire increases about 4% as the tire is expanded to fit the mold. Therefore, the force necessary to cause the cables of the overlay to elongate 4% is critical. If the force is too large the overlay will be under such a high tension that the adjacent belt ply will be distorted. Such a condition causes nonuniformity in the tire, which will manifest itself as peak radial run-out values that are outside of manufacturer's tolerances.

It is recognized in the tire art that the undesirable results discussed above can be minimized if the force on the overlay cables during the process of shaping the tire into a mold is not greater than 12 Newtons. Therefore, a cable according to the invention has an elongation of 4% when subjected to a force of not greater than 12 Newtons.

Figure 5:
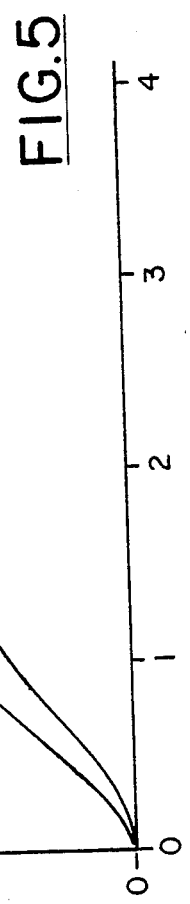
FIG. 5 is a graph showing stress-strain characteristics of a prior art cable and a cable according to the invention.

FIG. 5 is a graph showing the stress-strain curves of a cable according to the invention and a cable of the type currently being used in overlays. The "prior art cord" or cable is 840/2 Nylon 6,6 with a balanced twist of 12Z in each yarn and a cable twist of 12S, so that the resultant twist in the yarns are substantially equal to one another, such a cable is often referred to as being a balanced cable. The "new cord" or cable is a cable according to a preferred embodiment of the invention comprising 840/2 Nylon 6,6, one yarn having a yarn twist of zero, one yarn having a yarn twist of 14Z and the cable twist being 13S. It is clear from the graph that changing the twist of the yarns and cable as disclosed herein can have a significant effect upon the physical properties of the cable.

Tires have been manufactured under controlled conditions using cables of the types described in the preceding paragraph, the overlays in these tires comprised one complete wrap of side by side cables, with a lapped splice. In all other respects, the tire constructions were substantially the same. Tires having an overlay comprising the prior art cables had the splice length reduced by about ⅓ from the as built state to the vulcanized state, while the tires with the cables according to the invention had splice lengths reduced by only about 1/5 from the as built state to the vulcanized state. When these same tires were evaluated for uniformity characteristics (Radial Force Variation, Lateral Force Variation, Radial Run-Out and Lateral Run-Out), the tires containing overlays with cables according to the invention were better in every respect than the tires containing the prior art cables in their overlays. These tires were also X-rayed to determine the distortion in width of the belt ply adjacent to the overlay at the overlay splice. In each instance, the distortion was less in the tires that contained cables according to the invention. The only area in which the tires were tested and the tires containing the prior art cables in their overlays were slightly better was in high speed durability testing, but the tires containing the new cables were still within an acceptable range of results. In all other respects, the tires were substantially equal.

While at the time this application is being filed applicants believe that cables according to the invention could comprise any suitable material, it is preferred that the yarns of the cable comprise at least one material selected from the group consisting of: nylon 6, nylon 6,6, rayon, polyester and aramid. More preferably, the yarns consist of nylon 6 or nylon 6,6 and most preferably nylon 6,6.

In order to provide cables which are fine tuned for a particular tire one yarn of a cable may comprise a first material while the other yarn comprises a second material. For example, one yarn could comprises 840 denier nylon 6 and the other yarn could comprise 840 denier nylon 6,6.

Another way in which cables according to the invention can be fine tuned is to have both yarns comprise the same material with the denier of one yarn being greater than the denier of the other yarn. For example, one yarn could comprise 420 denier nylon 6,6 and the other yarn could comprise 840 denier nylon 6,6, or one yarn could comprise 500 denier polyester and the other yarn could comprise 1,000 denier polyester.

Yet another way in which cables according to the invention can be fine tuned is to have both yarns comprise the same material, but in one of the yarns, the material is altered to have different physical properties from the material in the other yarn. For example, one yarn could comprise 500 denier polyester having high shrinkage properties and the other yarn could comprise 500 denier polyester having low shrinkage properties.

In a cable according to the invention wherein both of the yarns have a yarn twist that is greater than zero, the larger of the two yarn twists should be at least twice as large, and preferably at least three times as large, as the lesser of the two yarn twists. If each of the two yarns comprises nylon 6 or nylon 6,6, it is preferred that the smaller of the two yarn twists be not greater than 5 turns per inch (197 turns per meter) and that the yarn twist of the second yarn be at least three times the yarn twist of the second yarn. If each of the two yarns comprises nylon 6 or nylon 6,6 and one of the yarns has a yarn twist of zero, then it is preferred that the second yarn have a yarn twist of at least 10 turns per inch (394 turns per meter), and most preferably a yarn twist in the range of 10 turns per inch (394 turns per meter) to 16 turns per inch (630 turns per meter). Most preferably, the cable twist of a cable according to the invention is not equal to the yarn twist of either of the yarns of the cable.

It is understood that a tire according to the invention may have a reinforcing member disposed radially outwardly of a belt ply with the reinforcing member (overlay) comprising cables according to any of the foregoing embodiment disposed at 0° to 20° with respect to a mid-circumferential plane of the tire.

While certain representative embodiments and details have been presented for the purpose of illustrating the invention, it will be apparent to those skilled in the art that various changes and modifications may be made therein without departing from the spirit or scope of the invention.

We claim:

1. A nonmetallic cable comprising two yarns twisted together with one another, each of said yarns comprising a plurality of filaments, said cable being manufactured by the process consisting of the steps of imparting a yarn twist to each of said yarns such that before said yarns are twisted together with one another one of said yarns has a yarn twist that is at least twice as large as the yarn twist of the other yarn, said yarn twists being in opposite rotational directions from one another, and then twisting both of said yarns together with one another to form a cable having a cable twist that is opposite in rotational direction to the twist of the yarn having the larger of the two yarn twists, the resultant twist of said yarns in said cable differing from one another by a factor of at least two and said cable having an elongation of at least 4% when subjected to a force of 12 Newtons.

2. A nonmetallic cable comprising two yarns twisted together with one another, each of said yarns comprising a plurality of filaments, with one of said yarns having a yarn twist of zero before the yarn is incorporated into a cable and the second yarn having a yarn twist in the range of 10 turns per inch to 16 turns per inch in a first rotational direction, said cable having a cable twist in a second rotational direction that is opposite to said first direction, and said cable having an elongation of at least 4% when subjected to a force of 12 Newtons.

3. A nonmetallic cable according to claim 1 wherein said yarns comprise at least one material selected from the group consisting of: nylon 6, nylon 6,6, rayon, polyester and aramid.

4. A nonmetallic cable according to claim 2 wherein said yarns comprise at least one material selected from the group consisting of: nylon 6, nylon 6,6, rayon, polyester and aramid.

5. A nonmetallic cable according to either one of claim 3 or 4 wherein one of said yarns comprises a first material and the other yarn comprises a different material.

6. A nonmetallic cable according to either one of claims 3 or 4 wherein both of said yarns comprise the same material and the denier of one yarn is greater than the denier of the other yarn.

7. A cable comprising two yarns twisted together with one another with each yarn comprising a plurality of filaments of at least one material selected from the group consisting of nylon 6 and nylon 6,6, said cable being manufactured by the process consisting of the steps of imparting a yarn twist to each of said yarns such that before said yarns are twisted together with one another one of said yarns has a yarn twist of greater than zero but not more than 5 turns per inch in a first rotational direction and said second yarn has a yarn twist that is at least three times the yarn twist of the first yarn in a second rotational direction, and then twisting said yarns with said yarn twists together with one another to form a cable having a cable twist in said first direction, the resultant twist of said yarns in said cable differing from one another by a factor of at least two and said cable having an elongation of at least 4% when subjected to a force of 12 Newtons.

8. A cable comprising two yarns twisted together with one yarn with each yarn comprising a plurality of filaments of at least one material selected from the group consisting of nylon 6 and nylon 6,6, before said yarns are twisted together with one another one of said yarns has a yarn twist of zero and the other yarn has a yarn twist in the range of 10 turns per inch to 16 turns per inch in a first rotational direction, said cable having a cable twist in a second rotational direction that is opposite to said first rotational direction, and said cable having an elongation of at least 4% when subjected to a force of 12 Newtons.

9. A tire comprising:
   (a) at least one carcass ply;
   (b) at least one belt ply disposed radially outwardly of said carcass ply in a crown portion of the tire; and
   (c) a reinforcing member disposed radially outwardly of said belt ply and comprising at least one nonmetallic cable disposed at 0° to 20° with respect to a mid-circumferential plane of the tire, said cable comprising two yarns twisted together with one another, each of said yarns comprising a plurality of filaments, before said yarns are twisted together with one another one of said yarns has a yarn twist that is at least twice as large as the yarn twist of the other yarn, said yarn twists being in opposite rotational directions from one another, said cable having a cable twist that is opposite in rotational direction to the twist of the yarn having the larger of the two yarn twists, the resultant twist of said yarns in said cable differing from one another by a factor of at least two and said cable having an elongation of at least 4% when subjected to a force of 12 Newtons.

10. A tire comprising:
    (a) at least one carcass ply;
    (b) at least one belt ply disposed radially outwardly of said carcass ply in a crown portion of the tire; and
    (c) a reinforcing member disposed radially outwardly of said belt ply and comprising at least one nonmetallic cable disposed at 0° to 20° with respect to a mid-circumferential plane of the tire, said cable comprising two yarns twisted together with one another, each of said yarns comprising a plurality of filaments, before said yarns are twisted together with one another one of said yarns has a yarn twist of zero and the second yarn has a yarn twist in a first rotational direction, said cable having a cable twist in a second rotational direction that is opposite to said first rotational direction, and said cable having an elongation of 4% when subjected to a force of 12 Newtons.

11. A tire according to claim 9 wherein said yarns comprise at least one material selected from the group consisting of: nylon 6, nylon 6,6, rayon, polyester and aramid.

12. A tire according to claim 10 wherein said yarns comprise at least one material selected from the group consisting of: nylon 6, nylon 6,6, rayon, polyester and aramid.

13. A tire according to either one of claims 11 or 12 wherein one of said yarns comprises a first material and the other yarn comprises a different material.

14. A tire according to either one of claims 11 or 12 wherein both of said yarns comprise the same material but the denier of one yarn is greater than the denier of the other yarn.

15. A tire comprising:
(a) at least one carcass ply;
(b) at least one belt ply disposed radially outwardly of said carcass ply in a crown portion of the tires; and
(c) a reinforcing member disposed radially outwardly of said belt ply and comprising at least one nonmetallic cable disposed at 0° to 20° with respect to a mid-circumferential plane of the tire, said cable comprising two yarns twisted together with one another with each yarn comprising a plurality of filaments of at least one material selected from the group consisting of nylon 6 and nylon 6,6, said cable being manufactured by the process consisting of the steps of imparting a yarn twist to each of said yarns, one of said yarns having a yarn twist of greater than zero but not more than 5 turns per inch in a first rotational direction and said second yarn having a yarn twist that is at least three times the yarn twist of the first yarn in a second rotational direction, and then twisting said yarns having said yarn twists together with one another to form a cable having a cable twist in said first rotational direction, the resultant twist of said yarns in said cable differing from one another buy a factor of at least two and said cable having an elongation of at least 4% when subjected to a force of 12 Newtons.

16. A tire comprising:
(a) at least one carcass ply;
(b) at least one belt ply disposed radially outwardly of said carcass ply in a crown portion of the tire; and
(c) a reinforcing member disposed radially outwardly of said belt ply and comprising at least one nonmetallic cable disposed at 0° to 20° with respect to a mid-circumferential plane of the tire, said cable comprising two yarns twisted together with one another with each yarn comprising a plurality of filaments of at least one material selected from the group consisting of nylon 6 and nylon 6,6, before said yarns are twisted together with one another one of said yarns has a yarn twist of zero and said second yarn has a yarn twist that is at least 10 turns per inch in a first rotational direction, said cable having a cable twist in a rotational direction that is opposite to said first rotational direction, and said cable having an elongation of at least 4% when subjected to a force of 12 Newtons.

17. A tire according to claim 16 wherein said cable twist is not equal to the twist of said second yarn.

* * * * *